US009015234B2

(12) United States Patent
Park et al.

(10) Patent No.: US 9,015,234 B2
(45) Date of Patent: Apr. 21, 2015

(54) AUTOMATED DISTRIBUTED TESTING ADMINISTRATION ENVIRONMENT

(75) Inventors: San Sun Park, Suwon-si (KR); Sang Deuk Shim, Viwang-si (KR); Yoon Hee Shin, Seoul (KR); Eun Young Choi, Anyang-si (KR); Sang Hyun Kim, Paju-si (KR)

(73) Assignee: LG CNS Co., Ltd., Seoul (KR)

( * ) Notice: Subject to any disclaimer, the term of this patent is extended or adjusted under 35 U.S.C. 154(b) by 330 days.

(21) Appl. No.: 13/557,653

(22) Filed: Jul. 25, 2012

(65) Prior Publication Data

US 2014/0032638 A1  Jan. 30, 2014

(51) Int. Cl.
*G06F 13/00* (2006.01)
*H04L 29/06* (2006.01)

(52) U.S. Cl.
CPC ............... *H04L 67/42* (2013.01); *H04L 29/06* (2013.01)

(58) Field of Classification Search
CPC ............. H04L 29/08072; H04L 29/06; H04L 29/0809; H04L 29/06074; G06Q 30/02
USPC ....................................................... 709/203
See application file for complete search history.

(56) References Cited

U.S. PATENT DOCUMENTS

| 5,827,070 | A | 10/1998 | Kershaw et al. | |
|---|---|---|---|---|
| 6,681,098 | B2 | 1/2004 | Pfenninger et al. | |
| 7,099,620 | B2 | 8/2006 | Miller | |
| 7,494,340 | B2 | 2/2009 | Bowers et al. | |
| 8,128,415 | B2 | 3/2012 | Rogers et al. | |
| 8,315,655 | B1 * | 11/2012 | Cole | 455/466 |
| 2011/0244440 | A1 * | 10/2011 | Saxon et al. | 434/362 |
| 2012/0253728 | A1 * | 10/2012 | Chamas et al. | 702/109 |
| 2012/0304296 | A1 * | 11/2012 | Shulman et al. | 726/23 |
| 2013/0179858 | A1 * | 7/2013 | Mecke et al. | 717/106 |
| 2014/0013305 | A1 * | 1/2014 | Ravikumar et al. | 717/124 |

FOREIGN PATENT DOCUMENTS

| JP | 2009525513 | 7/2009 |
|---|---|---|
| KR | 1020110010563 | 2/2011 |
| KR | 1020110104373 | 9/2011 |

* cited by examiner

*Primary Examiner* — Robert B Harrell
(74) *Attorney, Agent, or Firm* — Hunter E. Webb; Keohane & D'Alessandro, PLLC (57) ABSTRACT

Embodiments of this invention are directed to providing an approach that provides an Internet-based testing environment. In a typical embodiment, there is a cloud connect agent that executes while a test-taker is taking a test on a client device. The cloud connect agent is configured to monitor and control certain components of the client device.

24 Claims, 4 Drawing Sheets

AUTOMATED DISTRIBUTED TESTING ADMINISTRATION ENVIRONMENT

FIELD OF THE INVENTION

This invention relates generally to computer-based testing and more particularly to an approach for administering an Internet-based examination at a remote site.

BACKGROUND OF THE INVENTION

An examination (or test) may be administered to measure a candidate's qualifications in a profession or a student's knowledge in a particular subject area. Generally, the process of administering a written examination and reviewing the test results may extend over a period of days or, at times, weeks. The examination procedure may include preprinted examination papers and printed test results, which contribute to the expense and inefficiency of written examinations.

Computer-based testing has grown in popularity in the past few years. Computer-based testing (CBT) simply means a test situation where the student or candidate utilizes a computer terminal rather than a printed examination. Generally, the questions appear on the screen and the test-taker answers them by typing at the keyboard or clicking a mouse on the appropriate answer. This format has a number of advantages over the conventional paper and pencil examination.

Candidates complete CBT examinations with much more speed and efficiency than conventional examinations. This is due to the inherent ease of clicking with a mouse. Also, the test-taker is not required to constantly shift his eyes from question sheet to answer sheet.

Perhaps the most compelling advantage of CBT is its inherent flexibility in which the design and format can be easily modified to adapt to different circumstances. The most obvious difference between traditional testing and CBT is that a computer-based examination's content can be generated in real time according to some set criteria. This means that each test-taker might receive the same questions in a different order or perhaps even a different examination altogether.

CBT examinations also provide more options in reporting results. The raw scores and processed results can be provided in whatever format is desired. In addition, CBT results in cost savings in printing, storing, distribution, and collecting examinations.

Following the introduction of the Internet, computer-based testing evolved into Internet-based testing (IBT). In Internet-based testing, the test-taker is seated at a computer that is connected to the Internet. Usually, the software running is an Internet browser. A connection is established with a remote web server which sends to the browser a series of web pages. Again, the test-taker answers by clicking the mouse or entering information at the keyboard. By submitting the answers, the test-taker sends the answers back to the web server for processing.

IBT offers further advantages from CBT. The Internet is well suited to the delivery of multimedia content. The point and click approach to navigation on the Internet lends itself extremely well to an examination situation. Modern universities all have computer labs full of Internet-enabled computers and test-takers enjoy the convenience of taking the examination using existing university facilities instead of travelling to outside testing centers. By electing to use the Internet as the vehicle for its examination, the testing organization will be able to assert greater control over the process and will not have to contract with a private testing institution.

While the Internet has undergone explosive growth in the past few years, there are still many development issues for IBT including controlling the network connection and monitoring a test-taker's personal computer (PC) that the test-taker is using as a client in taking the examination. Therefore, there is a need for an improved approach for Internet-based testing that addresses the above-mentioned problems. Heretofore, several unsuccessful attempts have been made to address these shortcomings.

U.S. Pat. No. 5,827,070 discloses a test development system for producing a computerized test, a test delivery system for delivering the computerized test to an examinee, and a workstation on which the computerized test is delivered to the examinee.

U.S. Pat. No. 6,681,098 discloses a test administration system including a central computer that provides a website to be accessed by the test administrator and the test taker at remote personal computers when using the test administration system and associated database containing a plurality of tests that may be distributed to a test taker.

U.S. Pat. No. 7,099,620 discloses a method and system for administering a secure, Internet-based examination at remote sites in which the examination is dynamic and potentially adaptive.

U.S. Pat. No. 7,494,340 discloses a method for computer-based testing includes authoring a test specification and content of the at least one test using a test definition language, compiling the test specification and content of the at least one test to create a compiled test specification and content, which includes validating the test specification and content, storing the compiled test specification and content to a resource file, and retrieving the compiled test specification and content from the resource file during delivery of the test.

U.S. Pat. No. 8,128,415 discloses an online test platform adapted to facilitate the development, delivery, and management of educational tests with interactive participation by students, teachers, proctors, and administrators even when some or all of them are remotely located.

None of these references, however, teach an agent application that is used in an Internet-based testing environment that is able to monitor and control aspects of a test-taker's PC.

SUMMARY OF THE INVENTION

Embodiments of this invention are directed to providing an approach that provides an Internet-based testing environment. In a typical embodiment, there is a cloud connect agent that executes while a test-taker is taking a test on a client device. The cloud connect agent is configured to monitor and control certain components of the client device.

A first aspect of the invention provides a distributed test administration system comprising: a testing server; a participating client device remote from, but accessible to, the testing server over a communications network; the testing server being configured to coordinate the participating client device to perform a test; the participating client device configured to provide the test and return test results to the testing server; and a cloud connect agent configured to monitor a status of a plurality of components of the participating client device.

A second aspect of the invention provides a computer-readable medium storing computer instructions, which when executed, enables a computer system to provide a distributed test administration system, the computer instructions comprising: establishing a connection between a testing server and a participating client device over a communications network; providing a test to the participating client device over the connection; returning test results to the testing server; and monitoring a plurality of components of the participating client device.

A third aspect of the invention provides a computer-implemented method for providing a distributed test administration system, comprising: establishing a connection between a testing server and a participating client device over a communications network; providing a test to the participating client device over the connection; returning test results to the testing server; and monitoring a plurality of components of the participating client device.

A fourth aspect of the invention provides a method for deploying an Internet-based testing environment, comprising: providing a computer infrastructure operable to: provide a testing server; provide a participating client device remote from, but accessible to, the testing server over a communications network; coordinate the testing server and the participating client device to perform a test; provide the test on the participating client device and return test results to the testing server; and provide a cloud connect agent to monitor and control the participating client device.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to providing an approach that provides an Internet-based testing environment. In a typical embodiment, there is a cloud connect agent that executes while a test-taker is taking a test on a client device (e.g., personal computer). The cloud connect agent is configured to monitor and control certain components of the client device.

Figure 1:
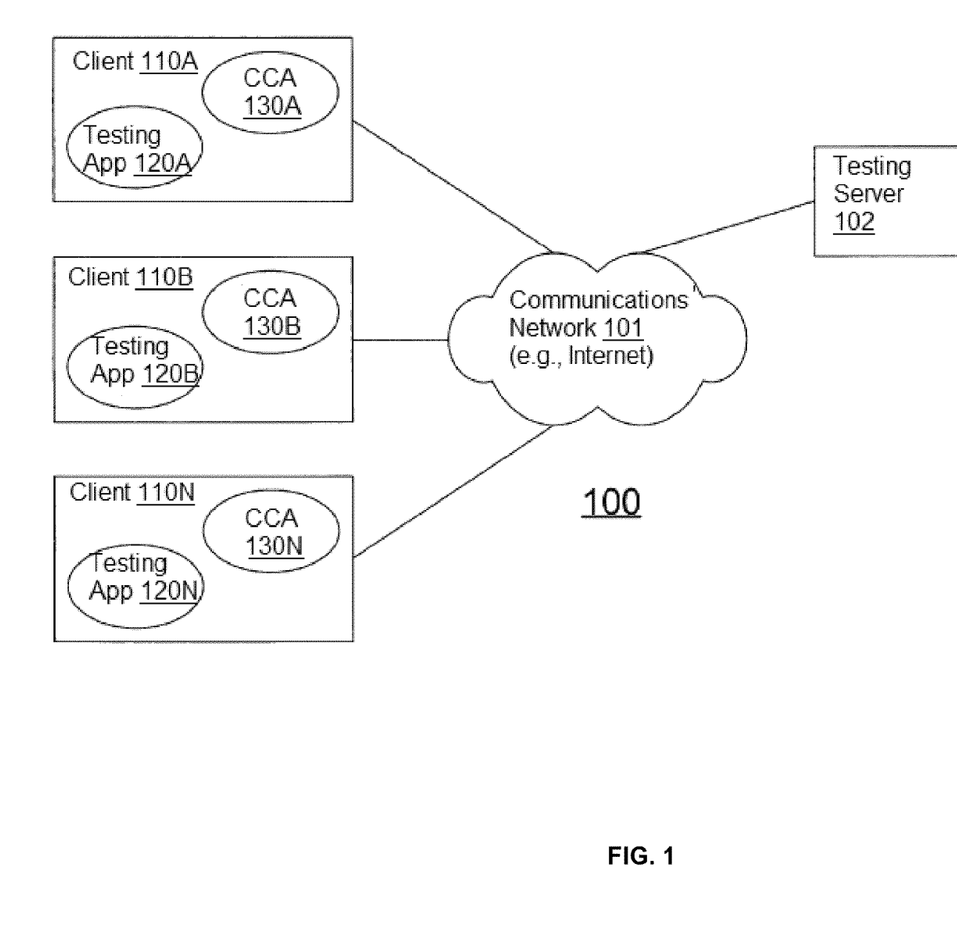
FIG. 1 shows a schematic of an exemplary Internet-based testing environment according to an embodiment of the present invention.

FIG. 1 shows a schematic of an exemplary Internet-based testing environment according to an embodiment of the present invention. This is intended to demonstrate, among other things, that the present invention may be implemented within a communications network 101 (e.g., the Internet, a wide area network (WAN), a local area network (LAN), or a virtual private network (VPN), etc.). Communication throughout the communications network 101 can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, FIG. 1 is used to demonstrate that some or all of the components of Internet-based testing environment 100 could be deployed, managed, serviced, etc., by a service provider who offers to implement, deploy, and/or perform the functions of the present invention for others. FIG. 1 is intended as an example and not as an architectural limitation for the present invention.

Testing server 102 is connected to communications network 101, and clients 110A-N also are connected to communications network 101. Clients 110A-N may be, for example, personal computers or network computers. For purposes of this application, a network computer is any computer, coupled to a communications network (e.g., an Internet Protocol network), which receives a program or data from another computer coupled to the communications network. In the depicted example, testing server 102 may provide data and applications to clients 110A-N. The internet-based testing environment 100 may include additional servers, clients, and other devices not shown.

Testing applications 120A-N are used to provide the test-takers utilizing clients 110A-N access a test (or examination) provided by one or more testing servers. For example, testing server 102 may provide a science test to the client machines determine the knowledge of the subject area by a student or group of students. Testing applications 120A-N may be Web-enabled browsers that access the testing service provided by testing server 102 to retrieve information.

Figure 2:
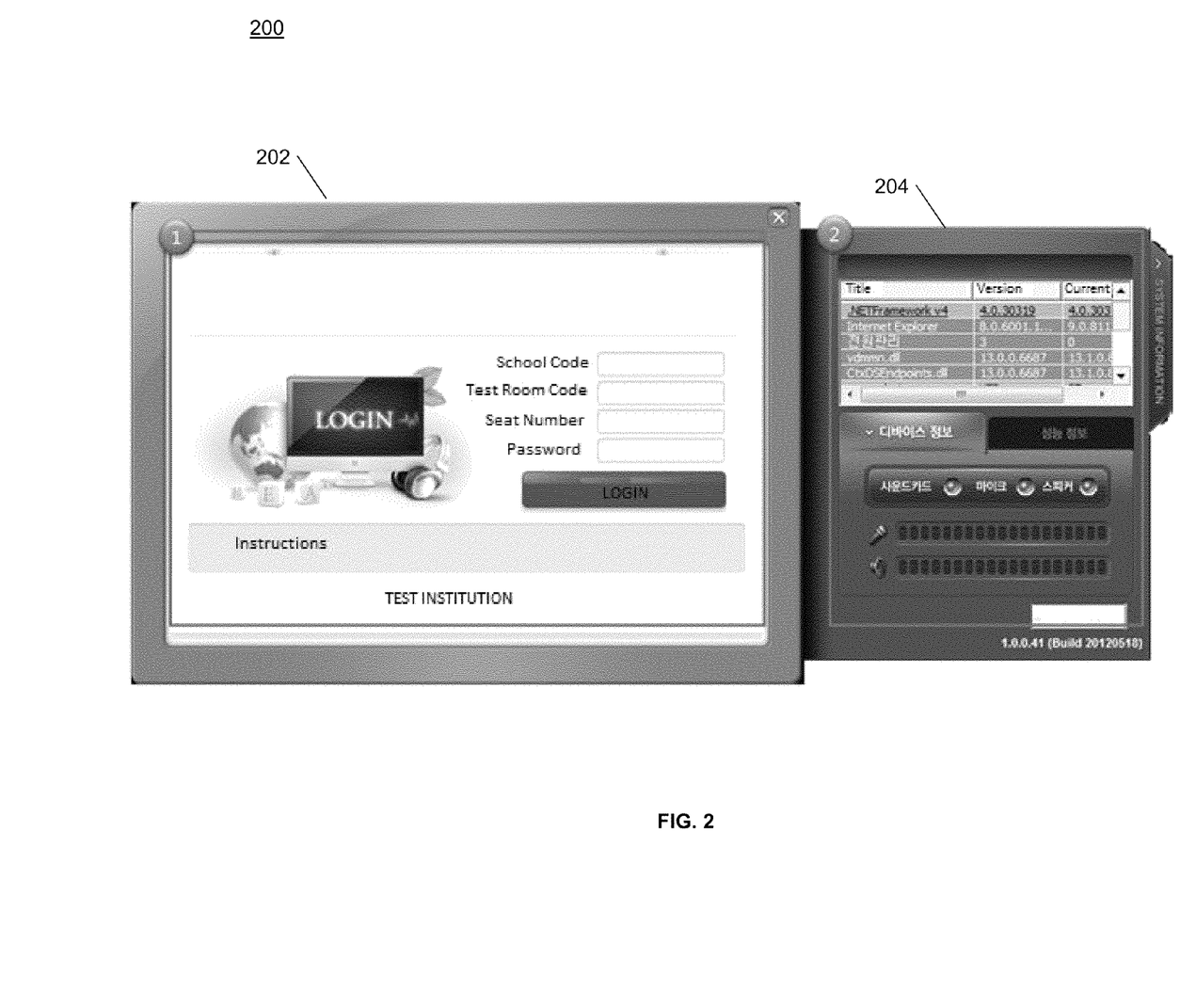
FIG. 2 shows an exemplary screen shot according to an embodiment of the present invention.

FIG. 2 shows an exemplary screen shot of a client according to an embodiment of the present invention. The cloud connect agent controls the network connection and is able to monitor the client device. The cloud connect agent display 200 is divided into two sections. The left-hand side depicts a login section 202 for the virtual machine (VM) connection. Upon successfully logging in, the user may be presented with the appropriate testing materials. A virtual machine (VM) is a completely isolated guest operating system installation within a normal host operating system. Modern virtual machines are implemented with either software emulation or hardware virtualization. In most cases, both are implemented together. The login screen may be optimized for a testing environment. For example, a test-taker (i.e., user) may enter a unique school code, room number, seat number combination that has been assigned by a testing administrator. The user may also be prompted to enter a password that has been previously assigned to the user. In addition, instructions may be displayed in this section to assist the user in the login process.

The right-hand side of the cloud connect agent display 200 shows a monitoring section 204 which displays information about the client device. In current VM software packages, only connection, password change, and VM reboot functions are allowed. Local monitoring and optimization of a client device are not allowed. Since monitoring and optimization of the client PC is not allowed, there is no way to check an application version and status of PC components (e.g., sound card, microphone, and the like). The lack of these automated functions may make a local PC service prone to error, which may lead to a loss of security control of the PC. The monitoring section 204 may display the different applications installed on the PC, along with the version number of the installation and the latest version number that is available. The section may also provide a status of various components of the PC, such as the sound card and microphone.

Figure 3:
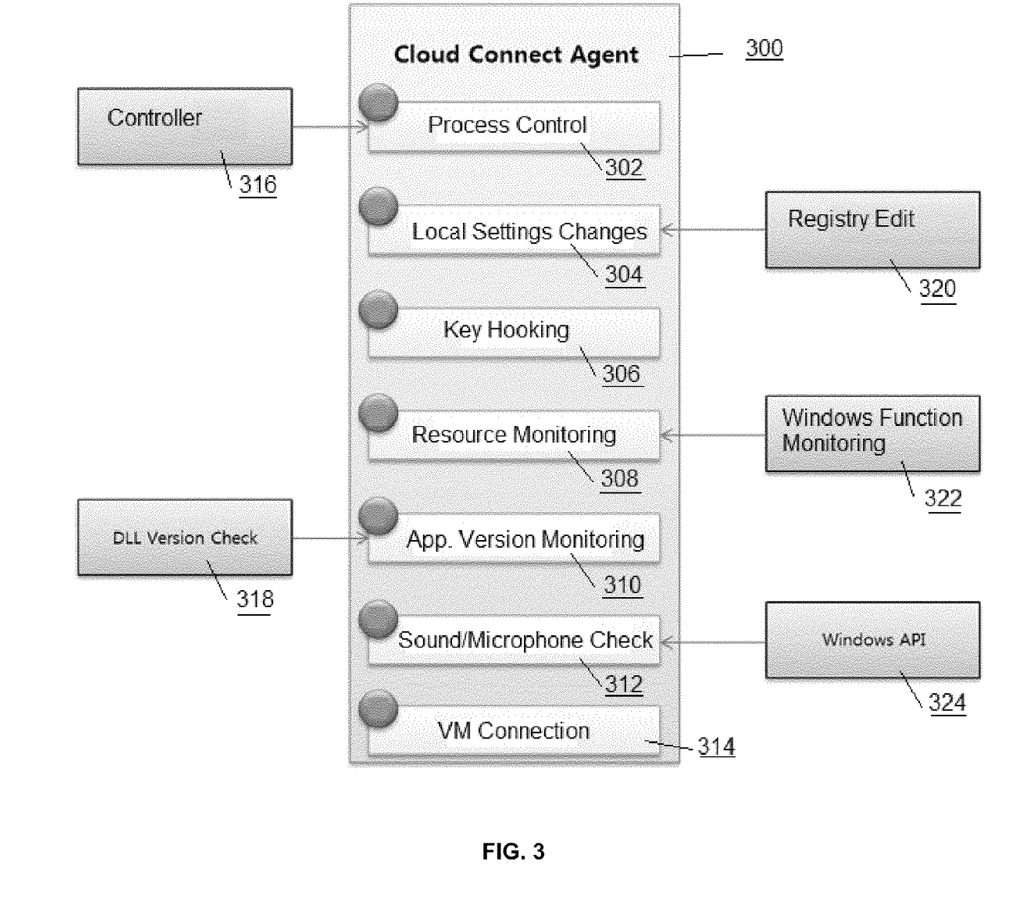
FIG. 3 shows an exemplary cloud connect agent and its functions according to an embodiment of the present invention.

FIG. 3 shows an exemplary cloud connect agent and its functions according to an embodiment of the present invention. On a VDI (Virtual Desktop Infrastructure), a remote test may be available on a local client device. The cloud connect agent of the present invention attempts to ensure the test is taken by the designated test person and efforts are made to keep the test-taker from cheating on the test. The functions of the cloud connect agent include: securing the testing content, optimizing the remote test system, and monitoring the remote test system.

Cloud connect agent 300 includes process control 302, local settings change 304, key hooking 306, resource monitoring 308, application version monitoring 310, sound/microphone check 312, and VM connection 314. Process control 302 is controlled by controller 316. Local settings changes 304 are done via registry edit 320. Resource monitoring 308 is done via windows function monitoring 322. Application version monitoring 310 is done via dynamic link library (DLL) version check 318. Sound/microphone check 312 is done via Windows application program interface (API) 324. In one example, the monitoring of resource utilization, program versions, and local PC hardware statuses may be done in one window for easy monitoring.

Process control 302 allows the cloud control agent to control any unnecessary applications running on the PC. For example, if a user is taking a test, it may be advisable to not allow the user to start an Internet browser section. In this case, the user could simply do research on the particular topic of the question or search for a correct answer. In one example, the cloud control agent may use a task list of currently executing applications and/or processes and perform a forced stop of any predefined applications or processes, such as Internet Explorer or Windows Explorer, that are running. Process control 302 may be configured to continuously monitor during the test taking by collecting the task list and force-stop any of a number of predefined processes or applications that are discovered (e.g., a backdoor process, an operation process that is not via cloud networking, a monitoring process and/or an unallowed program operation process, etc.).

Local settings changes 304 may also be performed by a registry edit 320. For example, predefined PC components or functions may be modified to optimize the PC. Local settings may also be changed in order to connect the testing server 102 and the client 110A-N (see FIG. 1). For example, the local PC monitor sleep mode time may be set to zero so the PC does not go into sleep mode which may distract the test-taker while the test-taker is considering how to answer a question on the test. Also, the screen saver function may be disabled for similar reasons.

Another cloud connect agent 300 function may include key hooking 306. In other words, only certain keys on the keyboard may be allowed for use while taking the test. For example, search and print screen function may be disabled. The testing administrator may not want to give the test-taker the ability to print while taking the test. If the test-taker is given printing capabilities, the test-taker may print out the entire exam and provide it to future test-takers.

Cloud connect agent 300 may perform various monitoring functions of a client device. Cloud connect agent 300 may perform monitoring of PC resources. The PC utilization may be displayed in monitoring section 204 of FIG. 2. Application version monitoring 310 may also be performed by the cloud connect agent 300. To that end, a testing application version may be determined for the VM connection. The title of the application, the installed version number of the application, and the latest available version number of the application may be displayed in monitoring section 204 of FIG. 2. In one example, a new DLL file for optimizing the PC on the test environment including the VM connection may be provided. A sound/microphone check 312 may be performed by Windows API 324 on the local sound card hardware. In other examples, other components of the PC may be monitored by resource monitoring 308. The status of the various components may be displayed in monitoring section 204 of FIG. 2. The agent may also monitor the VM connection 314. A notification may be provided to the user as to the status of the connection (e.g., 'currently connected' or 'connection was lost').

Figure 4:
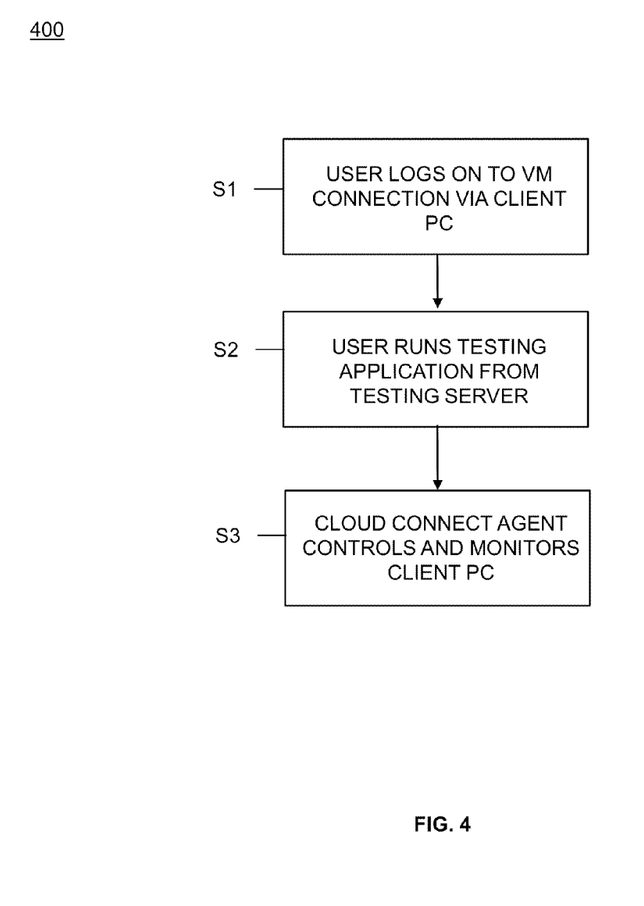
FIG. 4 shows an exemplary flow diagram for monitoring and controlling a client in an Internet-based testing environment according to an embodiment of the present invention.

Referring now to FIG. 4, an exemplary process flow 400 is illustrated for monitoring and controlling a client in an Internet-based testing environment according to an embodiment of the present invention. At S1, a user (i.e., test-taker) logs on to a VM connection via a client device, such as a PC. In one example, the test-taker may be admitted to a testing site and assigned a unique identification and password. In one example, the test-taker may log in using a school code, test room code, seat number, and password. In other examples, the test-taker may log in using other identification information. At S2, after a successful logging in process is completed, the test-taker begins the test/examination. The test may reside on the testing server 102 (of FIG. 1). At S3, the cloud connect agent may control and monitor the test-taker's PC, as described above in reference to FIG. 3.

It will be appreciated that the exemplary process flow 400 of FIG. 4 represents one possible implementation of a process flow for monitoring and controlling a client in an Internet-based testing environment, and that other process flows are possible within the scope of the invention. The process flow illustrates the architecture, functionality, and operation of possible implementations of systems, methods, and computer program products according to various embodiments of the present invention. In this regard, each portion of the flowchart may represent a module, segment, or portion of code, which comprises one or more executable instructions for implementing the specified logical function(s). It will also be noted that each block of the flowchart illustration can be implemented by special purpose hardware-based systems that perform the specified functions or acts.

It should be noted that, in some alternative implementations, the functions noted in the blocks may occur out of the order noted in FIG. 4. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

The present invention provides an approach for providing a testing administration environment. In particular, the present invention provides an Internet-based testing environment including a cloud connect agent that may monitor and/or control a client device of a test-taker. The cloud connect agent may provide application control, resource monitoring, driver status monitoring, application version checking, automatic installation, and/or key hooking.

Further, it can be appreciated that the methodologies disclosed herein can be used within an Internet-based testing environment 100 to provide a client monitoring and optimization service, as shown in FIG. 1. In this case, a cloud connect agent can be provided, and one or more systems for performing the processes described in the invention can be obtained and deployed to the Internet-based testing environment 100. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

The cloud connect agent may be described in the general context of computer-executable instructions, such as program modules, being executed by a computer. Generally, program modules include routines, programs, people, components, logic, data structures, and so on, that perform particular tasks or implement particular abstract data types. The cloud connect agent may be practiced in distributed computing environments where tasks are performed by remote processing devices that are linked through a communications network. In a distributed computing environment, program modules may be located in both local and remote computer storage media including memory storage devices.

Furthermore, an implementation of an exemplary cloud connect agent may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for providing a cloud connect agent for monitoring and controlling a client in an Internet-based test environment. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A distributed test administration system comprising:
   a testing server;
   a participating client device remote from, but accessible to, the testing server over a communications network;
   the testing server being configured to coordinate the participating client device to perform a test;
   the participating client device configured to provide the test and return test results to the testing server; and
   a cloud connect agent located on the participating client device and configured to:
      monitor a status of a plurality of components of the participating client device to determine whether hardware components necessary to perform the test are present on the participation client device; and
      modify the participating client device to: perform a force-stop of any prohibited processes, edit the registry to modify operating system functions, and disable keys on a keyboard of the participation client device that are not necessary to perform the test.

2. The distributed test administration system of claim 1, the cloud connect agent further configured to control the participating client device based on at least one respective status of the plurality of components of the participating client device.

3. The distributed test administration system of claim 2, wherein the control comprises at least one of controlling a process, modifying a local setting, or performing a key hooking process.

4. The distributed test administration system of claim 1, wherein the participating client device is a personal computer.

5. The distributed test administration system of claim 1, the cloud connect agent further configured to monitor one or more system resources of the participating client device.

6. The distributed test administration system of claim 1, the cloud connect agent further configured to determine one or more application versions installed executing on the participating client device.

7. The distributed test administration system of claim 1, the cloud connect agent further configured to monitor a connection between the participating client device and the testing server.

8. The distributed test administration system of claim 1, wherein the plurality of components comprises at least one sound card or microphone.

9. A computer-readable medium storing computer instructions which, when executed, enables a computer system to provide a distributed test administration system, the computer instructions comprising:
   establishing a connection between a testing server and a participating client device over a communications network;
   providing a test to the participating client device over the connection;
   returning test results to the testing server;
   monitoring, on the client device a status of a plurality of components of the participating client device to determine whether hardware components necessary to perform the test are present on the participation client device; and
   modifying the participating client device to: perform a force-stop of any prohibited processes, edit the registry to modify operating system functions, and disable keys on a keyboard of the participating client device that are not necessary to perform the test.

10. The computer-readable medium according to claim 9, further comprising computer instructions for controlling the participating client device based on at least one respective status of the plurality of components of the participating client device.

11. The computer-readable medium according to claim 10, wherein the controlling comprises at least one of controlling a process, modifying a local setting, or performing a key hooking process.

12. The computer-readable medium according to claim 9, wherein the participating client device is a personal computer.

13. The computer-readable medium according to claim 9, further comprising instructions for monitoring one or more system resources of the participating client device.

14. The computer-readable medium according to claim 9, wherein further comprising instructions for determining one or more application versions installed executing on the participating client device.

15. The computer-readable medium according to claim 9, further comprising instructions for monitoring a connection between the participating client device and the testing server.

16. The computer-readable medium according to claim 9, wherein the plurality of components comprises at least one sound card or microphone.

17. The computer-implemented method for providing a distributed test administration system, comprising:
    establishing a connection between a testing server and a participating client device over a communications network;
    providing a test to the participating client device over the connection;
    returning test results to the testing server;
    monitoring, on the client device a plurality of components of the participating client device to determine whether hardware components necessary to perform the test are present on the participation client device; and
    modifying the participating client device to: perform a force-stop of any prohibited processes, edit the registry to modify operating system functions, and disable keys on a keyboard of the participation client device that are not necessary to perform the test.

18. The computer-implemented method of claim 17, further comprising controlling the participating client device based on at least one respective status of the plurality of components of the participating client device.

19. The computer-implemented method of claim 18, wherein the controlling step comprises at least one of controlling a process, modifying a local setting, or performing a key hooking process.

20. The computer-implemented method of claim 17, wherein the participating client device is a personal computer.

21. The computer-implemented method of claim 17, further comprising monitoring one or more system resources of the participating client device.

22. The computer-implemented method of claim 17, further comprising determining one or more application versions installed executing on the participating client device.

23. The computer-implemented method of claim 17, further comprising monitoring a connection between the participating client device and the testing server.

24. A method for deploying an Internet-based testing environment, comprising:
    providing a computer infrastructure operable to:
        provide a testing server;
        provide a participating client device remote from, but accessible to, the testing server over a communications network;
        coordinate the testing server and the participating client device to perform a test;
        provide the test on the participating client device and return test results to the testing server; and
        provide a cloud connect agent, located on the participating client device, to;
            monitor a status of a plurality of components; and
            control the participating client device based on at least one respective status of the plurality of components of the participating client device by: performing a force-stop of any prohibited processes, editing the registry to modify operating system functions, and disabling keys on a keyboard of the participation client device that are not necessary to perform the test.

* * * * *

UNITED STATES PATENT AND TRADEMARK OFFICE
CERTIFICATE OF CORRECTION

PATENT NO. : 9,015,234 B2  
APPLICATION NO. : 13/557653  
DATED : April 21, 2015  
INVENTOR(S) : Park et al.

Page 1 of 1

It is certified that error appears in the above-identified patent and that said Letters Patent is hereby corrected as shown below:

In the Claims,

Claim 1, Column 8, Line 6, Delete "participation" and Insert -- participating --;

Claim 1, Column 8, Line 10, Delete "participation" and Insert -- participating --;

Claim 9, Column 8, Line 50, Delete "participation" and Insert -- participating --;

Claim 9, Column 8, Line 55, Delete "participation" and Insert -- participating --;

Claim 17, Column 9, Line 25, Delete "participation" and Insert -- participating --;

Claim 17, Column 9, Line 29, Delete "participation" and Insert -- participating --; and Claim 24, Column 10, Line 35, Delete "participation" and Insert -- participating --.

Signed and Sealed this  
First Day of September, 2015

Michelle K. Lee  
*Director of the United States Patent and Trademark Office*